United States Patent [19]

Wechsler

[11] Patent Number: 5,121,709
[45] Date of Patent: Jun. 16, 1992

[54] TERRARIUM BASKING ACCESSORY FOR USE WITH AQUARIUMS

[76] Inventor: Lawrence I. Wechsler, 1 Wooleys La., Great Neck, N.Y. 11023

[21] Appl. No.: 663,475

[22] Filed: Mar. 4, 1991

[51] Int. Cl.⁵ ............................................ A01K 63/00
[52] U.S. Cl. ........................................................ 119/5
[58] Field of Search ................. 119/5; 446/153; 4/578, 4/579

[56] References Cited

U.S. PATENT DOCUMENTS

| | | | |
|---|---|---|---|
| 3,141,442 | 7/1964 | Harris | 119/5 |
| 3,517,649 | 6/1970 | Holden | 119/5 |
| 3,699,921 | 10/1972 | Janicek | 119/5 |
| 3,747,566 | 7/1973 | Lovitz | 119/5 |
| 3,804,064 | 4/1974 | Kuneman et al. | 119/5 |
| 4,201,153 | 5/1980 | Nace | 119/5 |
| 4,708,089 | 11/1987 | Goldman et al. | 119/5 |
| 4,820,556 | 4/1989 | Goldman et al. | 119/5 |

Primary Examiner—Robert P. Swiatek
Assistant Examiner—Todd E. Manahan

[57] ABSTRACT

A fabricated structure is used with an aquarium tank partially filled with water to provide an aquatic reptile or amphibian with a balanced environment consisting of dry land, shallow water and an area of relatively deep water. The structure consists of a substantially horizontal platform provided with leg members that extend outwardly and downwardly, serving to elevate the platform above the water and isolate it from the inside vertical walls of the aquarium. The area beneath the platform remains available to the animal for swimming purposes and water is allowed to freely circulate to insure proper filtration. In a preferred embodiment, one of the legs is modified to form a ramp leading up to the platform to facilitate access by the animal occupants. By limiting support of the platform to three members including the ramp member, the stability of the structure is assured when placed on even the most uneven bottom surface. The principles set forth may be incorporated in a structure textured and colored to closely resemble a driftwood branch or other naturally occurring formation.

8 Claims, 2 Drawing Sheets

TERRARIUM BASKING ACCESSORY FOR USE WITH AQUARIUMS

BACKGROUND OF THE INVENTION

This invention relates to home aquarium accessories, and more particularly to a fabricated structure for use in a conventional aquarium tank such that a balanced ecological system is provided for turtles and amphibians consisting of dry land, shallow water and a deeper water section.

Amphibians and aquatic reptiles, including many varieties of turtles, require an environment containing a substantial depth of water for feeding and exercise, a shallow area for resting purposes and a dry surface on which to remove themselves for the purpose of drying out and to derive the benefits of heat and satisfy certain metabolic needs from an overhead light source. In the past, these animals have been generally kept in an aquarium containing a relatively shallow depth of water in which a dry land area was provided by including rocks and other such material. However, these shallow conditions do not provide the amphibian with sufficient in-water exercise, nor do they allow for effective filtration of the water. In addition, the type of rocks or driftwood used to create a dry land area would often adversely affect the quality and pH of the water within the tank.

When the depth of water within an aquarium is increased to a level sufficient to provide an amphibian or aquatic reptile with an opportunity to swim and exercise freely, it becomes a difficult task to provide a shallow region for resting in the water, as well as a dry basking area. The prior art attempts to solve the problem of supplying a proper combination environment for amphibious animals by a variety of approaches.

Harris, U.S. Pat. No. 3,141,442 discloses a floating raft with steps to allow the animal to get completely out of the water. In addition to failing to provide a completely balanced environment, the nature of the device results in an unstable surface, prone to tilting, moving and even sinking below the surface of the water when used with a large animal or a number of occupants.

In U.S. Pat. No. 3,786,781 issued to Poulsen, an enclosure for placement atop a conventional aquarium is described in which animal occupants are permitted access to the dry top structure via a ramp extending downwardly into the filled aquarium tank. The add-on section is fully enclosed to prevent escape. Although satisfying utilitarian needs, this arrangement is cumbersome and detracts from the aesthetic appeal.

A similar structure for use atop an aquarium is disclosed in U.S. Pat. No. 3,804,064 issued to Kuneman et al to have a peripheral platform and a central ramp descending downwardly below the surface of the water. Since the unit engages the top perimeter of the aquarium, the dimensions of the structure are critical to insure a proper fit with various size tanks. In addition, since the basking surface is peripherally located, the adjacent walls enclosing the add-on structure must be made sufficiently high to prevent the animal from climbing over the top edge.

Accordingly, it is a principal object of the present invention to provide a structure for use in a conventional aquarium that provides an amphibian or aquatic reptile with a balanced environment containing a sufficient depth of water and a region of shallow water with easy access to and from a dry land area.

It is a further object to provide a device that maximizes the available area within the enclosure and which does not interfere with efficient filtration of the water.

It is a still further object to provide these utilitarian features with a structure that is not only easy to use and maintain, but which will enhance the natural appearance of the entire terrarium without in any way contaminating or clouding the water within the enclosure.

SUMMARY OF THE INVENTION

The present invention comprises an integrated structure, which when used in a conventional aquarium partially filled with water, allows an amphibian or aquatic reptile to move readily between a water environment of varying depth and a dry basking surface above.

The structure consists of a relatively flat, horizontal surface positioned atop leg members which ascend diagonally toward an apex, the legs being further apart at their lowest point and closer together as they approach the platform. At their bases, the leg members are spaced an appropriate distance apart to fit securely between at least two of the inner walls of the aquarium to prevent movement or shifting of the structure within the tank. As a result, the uppermost basking surface is centered within the tank, isolated from the walls of the aquarium by water on all sides. Water within the tank is maintained at a level below the top edge of the aquarium, at such a height as to allow the structure to be only partially submerged. In a preferred embodiment, the structure is provided with three leg members, one being modified to form a gently sloping ramp. This serves a dual function of allowing the animal easy access to the uppermost level of the structure while at the same time providing a region of decreasing water depth, permitting the amphibian to rest below the water. In addition, with this tripod arrangement, the basking structure is certain to contact the tank bottom at all three points to provide sure footing.

DETAILED DESCRIPTION OF THE PREFERRED EMBODIMENT

Figure 1:
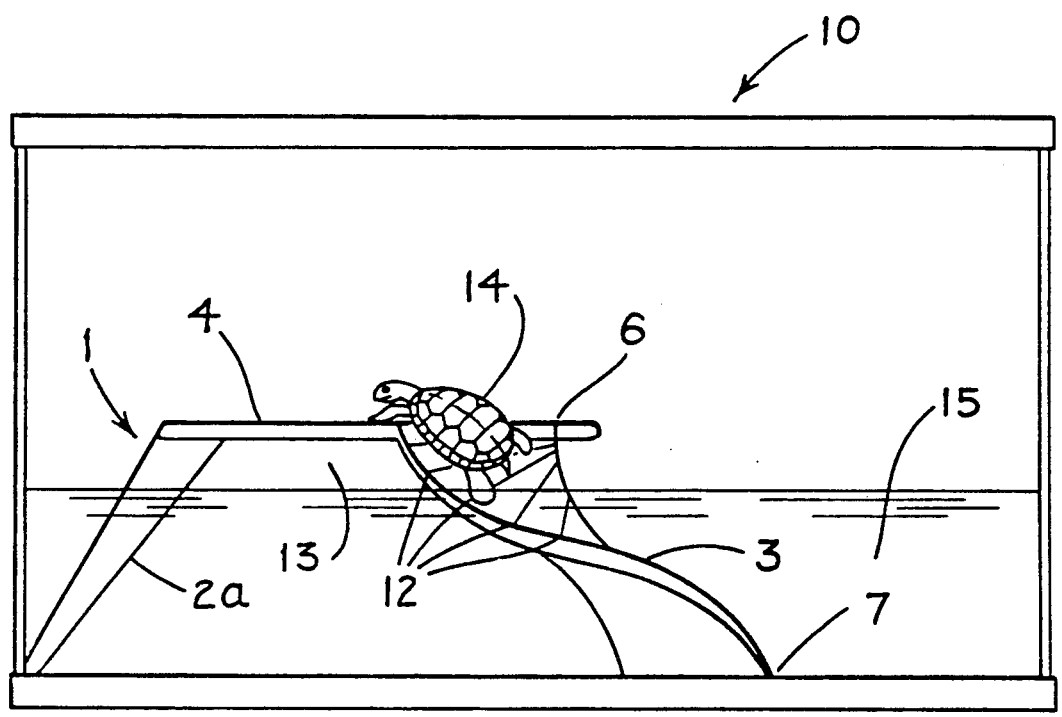
FIG. 1 is a side view of the present invention and showing the typical placement within a conventional aquarium.
Figure 2:
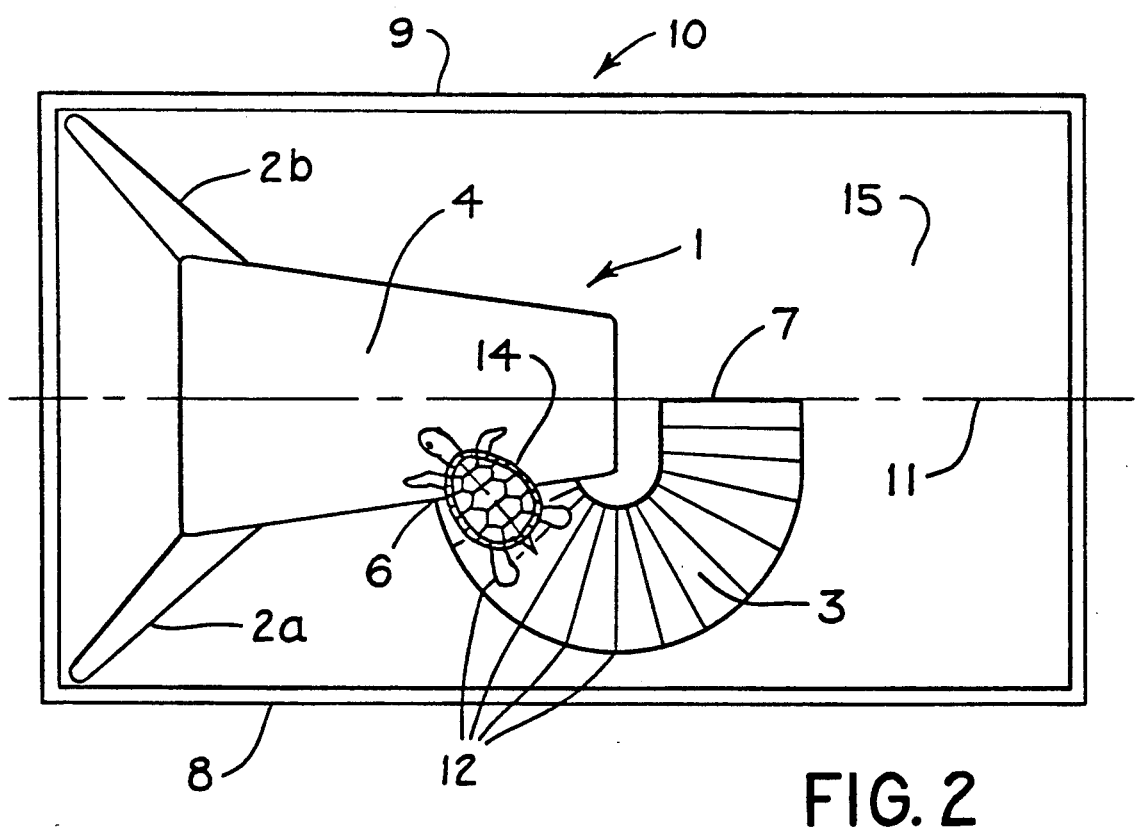
FIG. 2 is a top view of the same structure in FIG. 1.

Referring now to the drawings wherein like reference numerals designate identical or corresponding parts in the different views and embodiments, and more particularly to FIG. 1 and 2 thereof. Reference numeral 1 generally designates the basking structure adapted to be disposed within a conventional aquarium 10. The leg members 2a and 2b in combination with the ramp leg member 3 support the basking platform 4 in a generally horizontal position above the water 15 which is filled to a level of about one half the height of the aquarium 10. The leg members 2a and 2b are connected to the basking platform 4 and extend outwardly and downwardly, such that they are further apart at their bases, and closer together at their point of connection with the basking platform 4. As a result, the basking platform 4 is isolated around its entire perimeter from the walls of the aquarium 10. The substantial depth of water 15 surrounding the basking platform 4 prevents an animal 14 in the aquarium 10 from climbing out, as might be the case if the basking platform 4 were positioned such that it was in proximity to one of the walls of the aquarium 10. At their bases the leg members 2a and 2b are spaced an appropriate distance apart to fit securely between the front and back walls 8 and 9 of the aquarium 10 to prevent movement of the basking structure 1. Fortunately, the width between the front and back of an aquarium generally remains a constant independent of tank size since only the length and height are varied. This allows a single basking structure 1 to fit properly within a wide range of tank sizes.

At the opposite end of the basking platform 4 the basking structure 1 is supported by the ramp leg member 3 which connects level with the basking platform 4 at the upper end 6 of the ramp leg member 3. The ramp leg member 3 descends downwardly in a gently sloping spiral that terminates at the ramp base 7. The ramp base 7 is positioned along the centerline 11 of the basking platform 4. Because the basking platform 4 is isolated from the front and back walls 8 and 9 of the aquarium 10, the centerline 11 of the basking platform 4 also lies roughly halfway between the front and back walls 8 and 9 of the aquarium 10. Positioning the ramp base 7 in such a way, directly below the center of gravity of the basking structure 1, prevents the basking structure 1 from tipping over as weight is applied to any area of the basking platform 4.

The ramp leg member 3 is textured in order to increase traction. As shown in the FIG. 1 and 2, this may be accomplished by providing a number of grooves 12 aligned substantially perpendicular to the direction of travel of an animal 14.

An important element of the present invention is the absence of any submerged, overhead obstructions that might cause a turtle or amphibian to become confused or trapped and might adversely affect its ability to surface in order to obtain air to breathe. This is avoided by maintaining an air space 13 between the surface of the water 15 and the underside of the basking platform 4. Tilting the basking platform 4 slightly off the horizontal is also useful in guiding a submerged animal 14 safely to the surface.

Because the ramp leg member 3 and the two leg members 2a and 2b are the only parts submerged in the water 15, lightweight material with a density less than that of water, such as certain plastics, may be used in fabricating the basking structure 1 without encountering a buoyancy problem. Nevertheless, the basking structure may be anchored for additional stability by using suction cups or cement if so desired. The openness of the submerged part of the basking structure 1 also allows complete circulation of the water 15 below the basking platform 4, assuring effective filtration. In addition, an animal 14 is permitted free access to all points below the basking platform 4 that might be otherwise wasted, thus maximizing the available swimming area within the aquarium 10.

Figure 3:
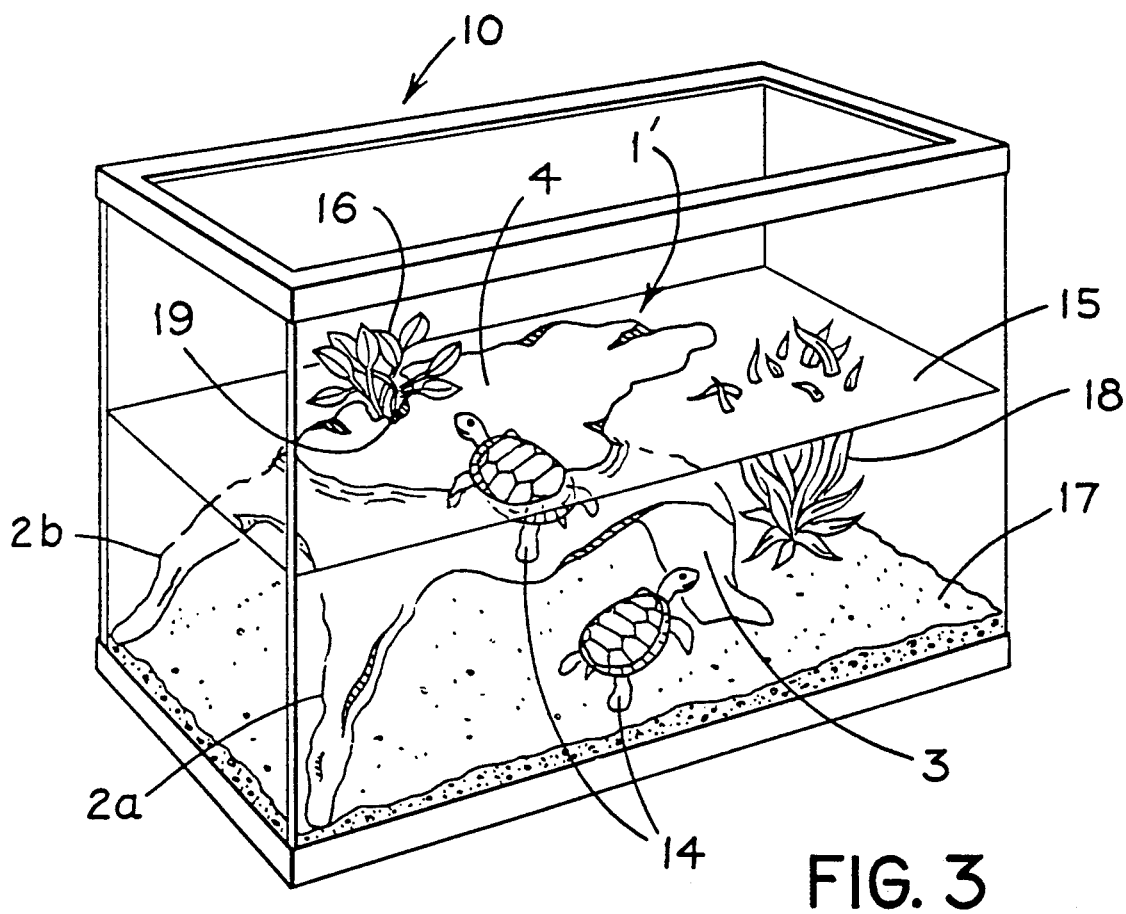
FIG. 3 is a perspective view of an embodiment of the present invention utilizing the basic shape in a structure that mimics a natural formation.

Referring now to FIG. 3, therein illustrated is another embodiment of the basking structure of the present invention generally designated 1'. All structural elements are the same as the embodiment shown in FIGS. 1 and 2, however additionally the basking structure 1' of FIG. 3 is made to mimic closely a formation that would occur in nature, i.e. driftwood, rocks or similar items, such that when placed in the aquarium 10, a realistic as well as functional ecosystem results. The basking platform 4 is suspended atop the leg members 2a and 2b and by the ramp leg member 3, all of which are textured and colored to resemble driftwood. The basking platform 4 is tilted slightly off the horizontal such that it is only partially submerged below the water 15, allowing an animal 14 to follow easily the contour of the underside of the basking platform 4 and readily navigate to the surface for air. A depression 19 in the top of the basking platform 4 may also be provided for the inclusion of plants 16 above the water 15.

Gravel 17 and an aquatic plant 18 may be added to the aquarium 10 to further enhance the simulation of a natural environment. The gravel 17 also stimulates the development of beneficial bacteria which assists in maintaining a healthy quality of the water 15 within the aquarium 10. It should be noted that since the basking structure 1' provides all necessary dry surface and submerged gradations, a substantial depth of gravel 17 is no longer required to build up a land area, as was previously the case. This is a distinct improvement over the prior art in that the growth of harmful, anaerobic bacteria is discouraged by including only a shallow depth of gravel 17. It also makes possible the use of an undergravel filter if so desired.

The method of production used in the construction of the basking structure 1 and 1' according to the present invention will be determined by economics and other appropriate criteria at the time of manufacture, however in any event the material selected must not adversely affect the quality of the water 15, nor be toxic in any way to the inhabitants of the aquarium 10.

Although only a few embodiments of the present invention have been disclosed herein in full detail, various modifications thereon will become apparent to those skilled in the art. Accordingly, the spirit and scope of the invention are limited only by the appended claims.

I claim:
1. A terrarium accessory, in combination with an aquarium having a bottom and a substantially vertical peripheral boundary and containing a level of water, said terrarium accessory comprising:
   a substantially horizontal platform having a peripheral edge, and;
   a plurality of leg members, each extending outwardly and downwardly from the peripheral edge of said platform and in contact with the bottom of said aquarium whereby said platform is held at least partially above said level of water and whereby the peripheral edge of said platform is completely isolated from said peripheral boundary of the aquarium.
2. The terrarium accessory of claim 1, wherein said plurality of leg members is limited to three.
3. The terrarium accessory of claim 2 wherein one of said plurality of leg members is a ramp having a gradual incline.
4. The terrarium accessory of claim 3 wherein said ramp forms a vertical spiral originating at a point along the top peripheral edge of said platform and terminating at a lowermost end, said platform having a suitable center of gravity whereby said terrarium accessory will not tip over as weight is applied.
5. The terrarium accessory in claim 4, wherein said terrarium accessory is shaped and textured in a suitable way to resemble a formation occurring in nature.
6. The terrarium accessory of claim 1, wherein said terrarium accessory is shaped and textured in a suitable way to resemble a formation occurring in nature.

7. The terrarium accessory of claim 1 wherein at least one of said plurality of leg members is a ramp having a gradual incline.

8. A terrarium accessory, in combination with an aquarium having a bottom and a substantially vertical peripheral boundary and containing a level of water, said terrarium accessory comprising:

a substantially horizontal platform having a peripheral edge;

a plurality of leg members, each extending outwardly and downwardly from the peripheral edge of said platform and in contact with the bottom of said aquarium whereby said platform is held at least partially above said level of water and whereby the peripheral edge of said platform is completely isolated from said peripheral boundary of the aquarium, and;

at least one ramp with an uppermost and lowermost end and having a gradual incline, said ramp being connected at said uppermost end to the peripheral edge of said platform and extending diagonally downwardly at least partially below said level of water.

* * * * *